Aug. 17, 1965  L. R. ALEXANDER ETAL  3,201,587
INFRARED VAPOR MONITORING SYSTEM WITH MEANS TO CONTROL
THE INFRARED EMISSION FROM THE SOURCE
Filed Dec. 20, 1962
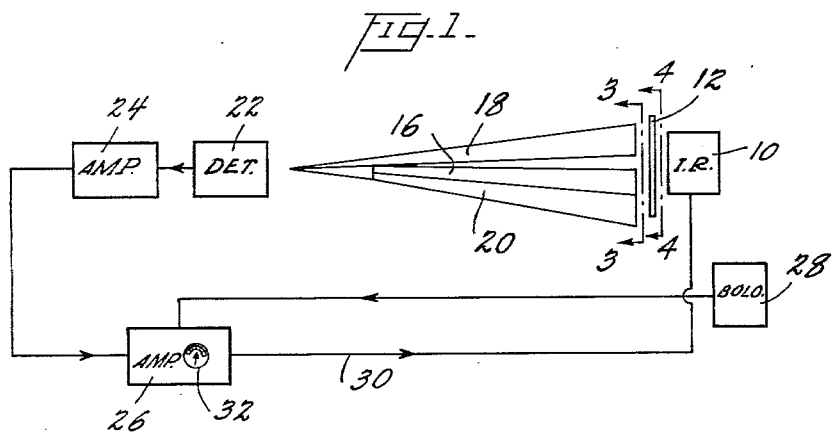
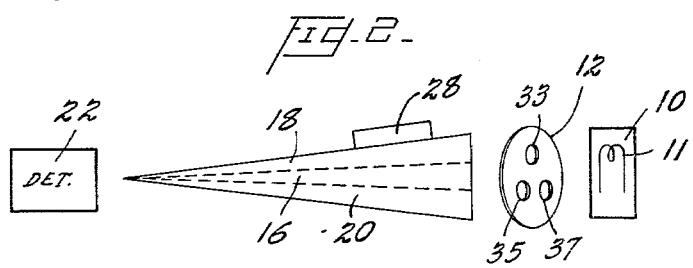
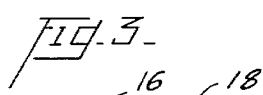
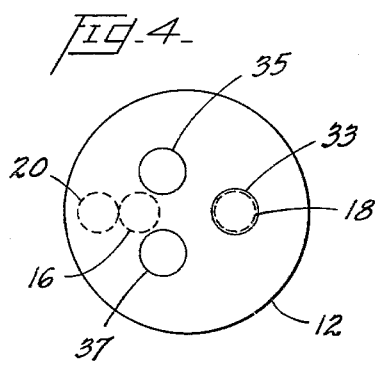
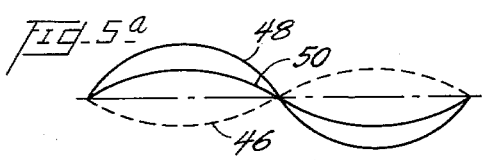
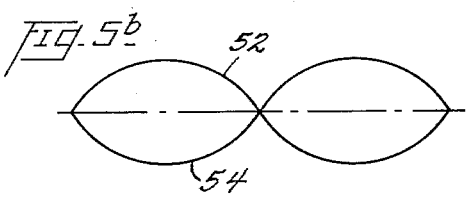
INVENTORS
Laurence R. Alexander
Stanley Wallack
BY Watson, Cole, Grindle & Watson
ATTORNEYS

United States Patent Office 3,201,587
Patented Aug. 17, 1965

3,201,587
INFRARED VAPOR MONITORING SYSTEM WITH MEANS TO CONTROL THE INFRARED EMISSION FROM THE SOURCE
Laurence R. Alexander, Armonk, and Stanley Wallack, Jackson Heights, N.Y., assignors to Leesona Corporation, Warwick, R.I., a corporation of Massachusetts
Filed Dec. 20, 1962, Ser. No. 246,089
1 Claim. (Cl. 250—43.5)

This invention relates to a vapor monitoring system and more particularly, to an electronic infrared vapor monitoring system.

Infrared gas analysis systems of the luft and similar types are well known in the art. These devices utilize either a spectrally selective or non-selective infrared detector and two tubular optical halves. A sample is inserted into one of these paths, which sample is to be analyzed. A second tube is employed as a reference for comparison and may contain either the gas in question or an infrared inert material, such as a vacuum or noble gas. Filters of gas or solid material are commonly used with systems of this type. Systems are referred to either as positive filter or negative filter type, depending upon whether the comparison or reference tube contains either the sample gas or is evacuated or filled with an inert gas. Presently known devices employ mechanical chopping or sequentially interrupt the infrared source, employing optical or filter chopping where required. The stabilization of the sample temperature may be accomplished by accessory thermostatic controls. These devices may be operated continuously to quantitatively determine the concentration of critical constituents in conventional chemical plant operation. They are also employed as standard instruments for analytical and general chemical laboratory use. These prior art devices, however, exhibit certain limitations and disadvantages. For example, it is necessary frequently to recalibrate the instrument to assure a high degree of accuracy of measurement. Further, no provision is made for quickly and easily achieving such a recalibration. Still further, these devices exhibit certain limitations with respect to the degree of infrared detection which can be recognized and employed to designate small changes in gas concentration.

Accordingly, it is an object of this invention to provide an improved infrared vapor monitoring system.

It is another object of this invention to provide an improved infrared vapor monitoring system having greatly improved stability and zero point.

It is a still further object of this invention to provide an infrared monitoring system with a built-in self-checking calibration device.

These and various other objects and features of this invention will be more clearly understood from a reading of the detailed description in conjunction with the drawing in which:

FIG. 1 is a combined schematic and block diagram of one illustrative embodiment of this invention;

FIG. 2 is a combined block and asymmetric pictorial representation of a portion of the device of FIG. 1;

FIG. 3 is a view of the device of FIG. 1 taken along the lines 3—3 of FIG. 1;

FIG. 4 is a view of the device of FIG. 1 taken along the lines 4—4; and,

FIGS. 5a and 5b are graphical representation of wave forms employed for the purpose of explaining the operation of the system.

Briefly, in accordance with aspects of this invention, an infrared source is employed selectively to direct infrared energy through three tubes or cylinders containing distinct contents. The first tube contains a sample gas to be analyzed, the second tube constitutes the reference or comparison tube and may, for example, be evacuated, while the third tube 20 comprises a calibration tube which will be explained in detail subsequently. The infrared energy is selectively directed through these three tubes and directed upon a detector cell and converted to an electrical signal which is amplified and directed in the form of a signal to voltmeter or similar indicating instrument. The voltmeter indicates the degree of concentration of the unknown gas in the first tube 16, the sample to be analyzed.

Advantageously, the chopper is driven in a rotary fashion between the infrared source and the several tubes mentioned above.

One of the features of this invention is the use of a calibration constant tube such that calibration takes place when desired, by moving the calibration tube into place thereby removing the sample tube. In the normal operation, the chopper alternately illuminates either the first or second tube, the third tube is out of line of the transmitted light. The output signal received by the amplifier provides a direct measure of concentration of the gas in sample tube 16.

When it is desired to calibrate the entire instrument, including the source, optical components, and sensing elements or electronic circuitry, this may be achieved by interjecting the standard tube blocking the beam through the sample tube while simultaneously permitting the beams to pass through tubes 18 and 20. Because tube 20 contains either a vacuum or suitable known concentration of the gas of interest, it serves as a direct comparison for the purpose of calibration. The choice between a vacuum or gas filled comparison tube is determined by the fill or the contents of the second tube so that tube 20 will be appreciably different from tube 18. In other words, if a vacuum is employed in tube 18, then a gas will be inserted in tube 20 and vice versa to give the maximum difference signal. The novel arrangement of the chopper permits two tubes to transmit infrared energy simultaneously and under these conditions tubes 18 and 20 alternately transmit infrared energy to the sensing element or detector cell. Because the contents of tube 18 and 20 are predetermined well known and independent of the sample under comparison, the output signal from the electronic network is predictable and constant during the calibration. Any departure from this expected signal indicates accumulative drift which can be corrected by suitable adjustment of the amplifier or other convenient means well known in the art. Further, the calibration and correction may be automatic in which case an error signal is developed and returned to control the level of the amplifier and thus, automatically compensate for any drift or change in the entire system.

Referring now to FIG. 1, there is depicted one illustrative embodiment of a vapor monitoring system according to this invention. As therein depicted, an infrared source 10 is positioned to transmit infrared energy through a chopper wheel 12. This chopper wheel selectively and sequentially directs infrared energy through two of the three tubes 16, 18, and 20. The sample tube 16 and calibration tube 20 are pivotally mounted so that either may be selectively positioned directly in line with the annular area swept by the chopper apertures, the other being at such time masked by the solid portion of the chopper. Tube 18 is evacuated, tube 16 contains an unknown gas sample, while tube 20 is the calibration tube. The infrared energy which selectively passes through the two tubes is directed to a single detector cell 22 which detects the amount of infrared energy received and develops an electrical signal indicative of the amount of infrared energy. This signal is fed from the detector to a first or preamlifier 24 where it is amplified and fed to a second amplifier 26. A corrective signal from a second amplifier channel is fed to the infrared source, the input of this channel is obtained from a bolometer which is a broad band detector. This bolometer, indicated by block 28 in FIG. 1, is positioned in the region of the infrared source to receive energy from the source and deliver a signal to the amplifier 26 indicative of the temperature of the source. As a result of the signal received by bolometer 28, the amplifier 26 maintains the temperature of the infrared source substantially constant by means of the path indicated by the conductor 30.

Advantageously, the amplifier 26 includes a meter 32 which indicates the level of the signal received from the amplifier 24 which signal is therefore indicative of the level of infrared energy passing through one of the tubes.

Referring to FIG. 2, there is depicted a view partially asymmetric of the tubes and the chopper wheel to more clearly explain the operation of these portions of the structure. The infrared source 10 is indicated as including a filament 11 which is heated by means of the conductor 30 in FIG. 1. Meter 32, which may be an R.M.S meter, indicates the algebraic sum of the magnitudes of the two sine waves from detector 22 which are 180° out of phase. The infrared energy from the filament 11 is radiated through the holes 33, 35, and 37 of the chopper wheel 12. Infrared energy is selectively transmitted through only two of the three tubes and this is done on a sequential basis because of the rotation of chopper wheel 12 and the relationship between the positioning of the apertures 33, 35, and 37 and the position of the two tubes. With this novel arrangement, the apertures 35, 37 and 33 are positioned apart a distance equal to the diameters of the apertures. Thus, infrared energy is selectively directed through either tubes 20–18 or 16–18. The infrared energy directed upon the tubes 16–18 or 18–20 is directed upon the detector cell 22 by the convergence of the tubes 16, 18 and 20. In the normal operation of the devices with tube 16 in position the infrared source alternately illuminates either tubes 16 and 18 while tube 20 is blocked by the choppr structure. The light signals received by the detector from each of the tubes are sinusoidal and positioned 180° apart. Meter 32 reads the R.M.S. algebraic difference of two signals and is thus a direct measure of concentration of the gas in tube 18. Periodically, it is desirable to determine the constancy of calibration of the entire system. This is accomplished by interchanging tube 20 for tube 16 so as to block the beam through sample tube 16 while simultaneously permitting the beam to pass through tubes 18 and 20. Because of the rotation of the chopper wheel, energy is now sequentially directed through tubes 18 and 20 which contain the vacuum and the calibration material. Under these conditions, infrared energy is alternately transmitted through chambers 18 and 20 and from the resulting output noted on meter 32, the temperature of the infrared source or the gain of the amplifier can be adjusted by suitable means such as a variable resistor or a variable transformer.

Referring now to FIG 3, there is depicted an end view of the tubes 16, 18 and 20 taken along the line 3—3 of FIG. 1. The axes of these tubes are positioned to cooperate with the chopper wheel in a manner previously explained and the manner which will be explained in greater detail with respect to FIG. 4.

Referring now to FIG. 4, there is depicted a view taken along the line 4—4 of FIG. 1. In this view, the chopper wheel 12 is shown in full lines, while the tube entrance apertures are shown in dotted lines. From the relative positioning of the apertures 33, 35 and 37 in the chopper wheel with respect to the apertures in tubes 20+16, it is apparent that only one of the tubes 16 and 20 can receive light at a time and the infrared energy will be sequentially directed upon only two of the tubes at a time, because of the out of line position of the other tube.

FIG. 5a illustrates wave forms of electrical signals in the amplifier 26 under various conditions. As previously indicated, meter 32 is an R.M.S. meter which indicates the algebraic sum of the magnitude of the two sine waves from detector 22 which are 180° out of phase. FIG. 5a indicates the wave forms when a gas is present in the sample tube 16. The dotted line wave form 46 indicates the signal developed from energy passing through the sample tube 16 and the wave form 48 represents the output signal developed by the transmission of energy through vacuum tube 18. The wave form 50 represents the algebraic sum of wave forms 46 and 48 and indicates the signal delivered at the output of the detector and indicated on the meter 32 under conditions in which a gas is present.

FIG. 5b indicates signals 52 and 54 which are received at the detector 26 when there is no gas in the sample tube 16. Signal 54 represents the infrared energy received by the detector through sample tube 16, while sine wave 52 represents the energy through the vacuum tube 18. Because these signals are equal in magnitude and opposite in polarity, the infrared energy received by the detector is constant in level, and a zero electrical signal is transmitted to the meter.

While I have shown and described one illustrative embodiment of this invention, it is understood that the concepts thereof can be employed in other embodiments without departing from the spirit and scope of this invention.

What is claimed is:

An infrared vapor monitoring system comprising three members two of which are positionable at any one time at equal distances from a common point, one of said members containing a sample gas to be analyzed, another of said members including a reference material and the third of said members including a calibration material, infrared source means for directing infrared energy in the direction of said members and means positioned between said source means and said members for sequentially defining a single light transmission path between only two of said chambers, source detector means positioned to receive infrared energy passing through said members and means responsive to said detector means for indicating the degree of transmission of infrared energy through said members, the means for sequentially defining a path comprising an apetured chopped wheel with apertures spaced from each other at a distance equal to the diameter of said apertures, the means for indicating the level of infrared energy transmission being coupled to said source to control the temperature and the resulting infrared emission from said source, a temperature responsive device positioned to indicate the temperature of said source and coupled to said indicating means to deliver a signal thereto indicative of said temperature, and a further signal representing the degree of transmission of infrared energy through the members, said indicating means combining said first mentioned signal with said further signal, thereby accurately to control the temperature of said source.

References Cited by the Examiner

UNITED STATES PATENTS

| | | | |
|---|---|---|---|
| 2,376,311 | 5/45 | Hood | 250—43.5 |
| 2,688,090 | 8/54 | Woodhull et al. | 250—43.5 |
| 2,720,594 | 10/55 | Hutchins | 250—43.5 |
| 2,754,424 | 7/56 | Woodhull et al. | 250—43.5 |
| 2,775,160 | 12/56 | Foskett et al. | 250—43.5 |
| 2,860,250 | 11/58 | Pouppirt | 250—43.5 |

RALPH G. NILSON, *Primary Examiner.*